US009699754B1

United States Patent
Mauer et al.

(10) Patent No.: US 9,699,754 B1
(45) Date of Patent: Jul. 4, 2017

(54) CONTROL MECHANISM FOR DECOMMISSIONED WIRELESS DEVICES

(71) Applicant: Sprint Spectrum L.P., Overland Park, KS (US)

(72) Inventors: Brian D. Mauer, Shawnee, KS (US); James V. Ralston, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 25 days.

(21) Appl. No.: 15/001,889

(22) Filed: Jan. 20, 2016

(51) Int. Cl.
| | |
|---|---|
| H04W 60/00 | (2009.01) |
| H04J 11/00 | (2006.01) |
| H04B 7/26 | (2006.01) |
| H04W 28/24 | (2009.01) |
| H04W 4/00 | (2009.01) |
| H04W 88/06 | (2009.01) |
| H04W 84/04 | (2009.01) |
| H04W 84/12 | (2009.01) |
| H04W 28/02 | (2009.01) |
| H04W 12/12 | (2009.01) |
| H04W 12/06 | (2009.01) |
| H04W 76/02 | (2009.01) |
| H04W 48/16 | (2009.01) |

(52) U.S. Cl.
CPC ........ H04W 60/005 (2013.01); H04B 7/2628 (2013.01); H04J 11/00 (2013.01); H04W 4/001 (2013.01); H04W 28/24 (2013.01); H04W 12/06 (2013.01); H04W 12/12 (2013.01); H04W 28/0205 (2013.01); H04W 48/16 (2013.01); H04W 76/027 (2013.01); H04W 84/045 (2013.01); H04W 84/12 (2013.01); H04W 88/06 (2013.01)

(58) Field of Classification Search
CPC ... H04W 76/027; H04W 12/06; H04W 48/16; H04W 88/06; H04W 84/12; H04W 12/12; H04W 28/0205
USPC ...................................... 455/410, 411, 414.1
See application file for complete search history.

(56) References Cited

U.S. PATENT DOCUMENTS

| | | | |
|---|---|---|---|
| 8,249,498 B1 * | 8/2012 | Pulugurta | H04W 4/001 370/328 |
| 2014/0177429 A1 * | 6/2014 | Patil | H04W 76/027 370/216 |

* cited by examiner

*Primary Examiner* — Charles Appiah
*Assistant Examiner* — Jaime Holliday (57) ABSTRACT

A method and corresponding system for causing a de-authorized or decommissioned wireless communication device (WCD) to refrain from initiating communications with one or more services and/or servers in a wireless communication system. The WCD may be configured for communicating with a wireless communication system via (i) air interface access with a radio access network (RAN) having a dedicated backhaul connection to the wireless communication system, and (ii) a wireless access device providing a communication link to at least one intermediate network in a communication path to the wireless communication system. In response to the WCD detecting a threshold number of consecutive failed attempts to gain air interface access via the RAN, the WCD would disable at least one computer application from attempting to initiate communications with the wireless communication system via the wireless access device.

20 Claims, 6 Drawing Sheets

CONTROL MECHANISM FOR DECOMMISSIONED WIRELESS DEVICES

BACKGROUND

Unless otherwise indicated herein, the materials described in this section are not prior art to the claims and are not admitted to be prior art by inclusion in this section.

To provide cellular wireless communication service, a wireless service provider, or "wireless carrier," typically operates a wireless communication system including a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations, each in turn including one or more base transceiver stations (BTSs) (e.g., macro network cell towers and/or femtocells) that may each radiate to define a cell and cell sectors in which WCDs can operate. Further, the RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other type of WCD that is positioned within coverage of the RAN can then communicate with a BTS and in turn, via the BTS, access various services provided by the wireless carrier, as well as communicate with other served devices or with other entities on the transport network.

Wireless communications between a WCD and a serving BTS in a given coverage area will typically be carried out in accordance with an agreed air interface protocol that defines a mechanism for wireless exchange of information between the WCD and BTS. Examples of such protocols include CDMA (e.g., 1xRTT, 1xEV-DO), iDEN, WiMAX (e.g., IEEE 802.16), LTE, TDMA, AMPS, GSM, GPRS, UMTS, or EDGE, and others now known or later developed. In addition or as an alternative to RAN access, a WCD may gain access to one or more services provided by the wireless carrier via one or another form of wireless access devices or systems operating according to one or more wireless access protocols such as IEEE 802.11 (WiFi), BLUETOOTH, and others.

OVERVIEW

Communications from a base station to a WCD are carried on a "forward link" (e.g., in a CDMA system) or "downlink" (e.g., in a UMTS/LTE network) of an air interface between the WCD and base station, and communications from a WCD to the base station are carried on "reverse link" (e.g., in a CDMA system) or "uplink" (e.g., in a UMTS/LTE network) of the air interface.

Upon power-on or upon moving into a new coverage area or encountering another designated registration trigger, a WCD transmits a registration request to the RAN, which in turn seeks to verify that the WCD is authorized to receive services in the wireless carrier's network, and if so, registers the WCD in the network. The registration verification process typically involves the RAN consulting an authorization server or the like, which then checks if the WCD has valid credentials stored in a subscriber database or the like. For example, credentials authorizing one or more services for a WCD may initially be established and stored in the subscriber database the first time the WCD is commissioned for service in the wireless carrier's network. Thereafter, registration requests from the WCD may be authorized by comparing authentication information provided in the requests with the credentials stored in the subscriber database. A WCD may also register in or via a different wireless service carrier's network, provided a service-level agreement is in place between the different carrier and the WCD's "home" carrier, and that the different carrier is able to verify the WCD's credentials in its home carrier's network.

Once a WCD's registration is established, the RAN may then grant a concurrent or subsequent request for air interface access from the WCD. In a typical scenario, a WCD seeking air interface access will transmit one or more access requests to the RAN. The RAN may then grant the request upon determining that the WCD is registered for service. In granting the request, the RAN may allocate air interface resources to the WCD, and with air interface resources allocated, the WCD may engage in communication services via the RAN. If the WCD is not registered and/or cannot be authenticated and authorized for service in the wireless carrier's network, the RAN will not grant the access request. In practice, the RAN may simply refrain from responding to an unauthorized WCD's access request, which may cause the WCD to transmit repeated access requests, each of which will go unanswered. After a threshold number of unanswered access request, each representing a failed access attempt by the WCD, the WCD may refrain from transmitting further requests, at least until one or another form of registration triggering event occurs (e.g., power cycling, moving to a new coverage area, etc.)

If authorization of a WCD's registration request fails, the WCD will not be registered and further access requests or requests for service in general will be denied (or ignored). In particular, when a WCD previously registered for service in a wireless carrier's network is decommissioned, for example when a subscriber buys and activates a new or replacement WCD, the previously registered WCD's credentials may be deleted from the subscriber database. As a result, future registration and/or access requests from the WCD will be denied. From the perspective of the decommissioned WCD, access requests will result in repeated failed access attempts.

In addition to providing network communication functions and capabilities, a typical WCD may also support and/or host various other computer applications, or "apps," such as audio playout, image and video display, games, to mention just a few. Some of these apps may interact with one or another server or communication device in or accessible via the wireless carrier's network. For example, a video streaming app may receive content from a video content server. Thus, a WCD may operate one or more apps that require some level communication with or via the wireless carrier's network.

As noted above, a WCD may also gain access to one or more services in or via the wireless carrier's network, or other transport networks, by way of a wireless access network other than the RAN. For example a WCD may be capable of communication in a WiFi network, such as a home wireless network or a WiFi "hotspot" (e.g, in a café, or other public or private space). Such wireless access may support apps and services that do not necessarily require exclusively RAN-based air interface protocols. For example, video streaming, web browsing, and email, to name a few, may be accessible to a WCD via a WiFi or other wireless access connection. Some such apps of a WCD may communicate with services offered by and/or hosted in the wireless carrier's network, possibly available only to the wireless carrier's subscribers. As such, a WCD may need to be registered in order to receive these services, even when they are accessed via a WiFi network or other alternative access that may not require the same WCD credentials as RAN access (or possibly not any credentials). Non-limiting examples of such services could include network back-up services (e.g., contact lists, WCD-stored content, etc.), network voicemail services, WCD system update delivery services, and app update delivery services, to name a few.

In particular, some apps or other programs of a WCD may initiate communication with a service or server in the wireless carrier's network automatically, according to a schedule or other programmed trigger. For example, an app may be programmed to automatically initiate nightly contact with a server in order to upload content for backup purposes, or to request content download, such as a system update, or to synchronize data content on the WCD with that in a network server. Such apps may be further be programmed to cause the WCD to first attempt to access the wireless carrier's network via the RAN, and then attempt wireless (non-RAN) access if RAN access fails.

A problem can arise in providing such network services when the WCD initiating the communications has been decommissioned or otherwise de-authorized from service in the wireless carrier's network. Specifically, when an app or other program causes such a decommissioned WCD to request air interface access via the RAN, the access request(s) will be denied, as described above. After a threshold number of failed access attempts, the app may then cause the WCD to access the relevant service and/or hosting server in the wireless carrier's network via a WiFi network, such as a WiFi access point connected to a local area network. Since the WCD has been decommissioned, it will not be registered, and may therefore denied the service and/or access to the server. However, the service or server may nevertheless undertake one or another form of authentication/authorization check in response to a request form the WCD. Such a check may correspondingly consume network resources and/or incur some operating overhead in the network. Further, some services may remain available to the WCD even when decommissioned, thereby making the network subject to resource consumption and/or additional operating overhead caused by a decommissioned WCDs.

While the overall impact of such service requests from one or a few decommissioned WCD made by way of wireless (e.g., WiFi) access may be relatively small or of no great significance, the total number of such decommissioned WCDs can be quite large, particularly as new generations of WCD are acquired by subscribers (users) to replace older generations of WCDs. As a result, the burden of service requests from decommissioned WCDs on a wireless carrier's network, even those received via wireless access, can become substantial. It would therefore be desirable to cause decommissioned WCDs (or those otherwise de-authorized from service in the wireless carrier's network) to refrain from initiating communication with services and/or servers in the wireless carrier's network. Disclosed herein is a technique for achieving this desirable operational behavior in decommissioned WCDs.

Hence, in one respect, various embodiments of the present invention provide, in a wireless communication device (WCD) configured for communicating with a wireless communication system via (i) air interface access with a radio access network (RAN) having a dedicated backhaul connection to the wireless communication system, and (ii) a wireless access device providing a communication link to at least one intermediate network in a communication path to the wireless communication system, a method comprising: detecting, by the WCD, a threshold number of consecutive failed attempts to gain air interface access via the RAN; and responsive to the detecting, the WCD disabling at least one computer application from attempting to initiate communications with the wireless communication system via the wireless access device.

In another respect, various embodiments of the present invention provide a wireless communication device (WCD) configured for communicating with a wireless communication system via (i) air interface access with a radio access network (RAN) having a dedicated backhaul connection to the wireless communication system, and (ii) a wireless access device providing a communication link to at least one intermediate network in a communication path to the wireless communication system, the WCD comprising: a transceiver for communicating on at least each of the air interface access with the RAN and a wireless interface with the wireless access device; one or more processors; and memory accessible to the one or more processors, and storing machine language instructions that, upon execution by the one or more processors, cause the WCD to carry out operations including: detecting a threshold number of consecutive failed attempts to gain air interface access via the RAN, and responsive to the detecting, disabling at least one computer application from attempting to initiate communications with the wireless communication system via the wireless access device.

In still another respect, various embodiments of the present invention provide a non-transitory computer readable medium having stored thereon instructions that, upon execution by one or more processors of a wireless communication device (WCD), cause the WCD to carry out operations, wherein the WCD is configured for communicating with a wireless communication system via (i) air interface access with a radio access network (RAN) having a dedicated backhaul connection to the wireless communication system, and (ii) a wireless access device providing a communication link to at least one intermediate network in a communication path to the wireless communication system, and wherein the operations include: detecting a threshold number of consecutive failed attempts to gain air interface access via the RAN; and responsive to the detecting, disabling at least one computer application from attempting to initiate communications with the wireless communication system via the wireless access device.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
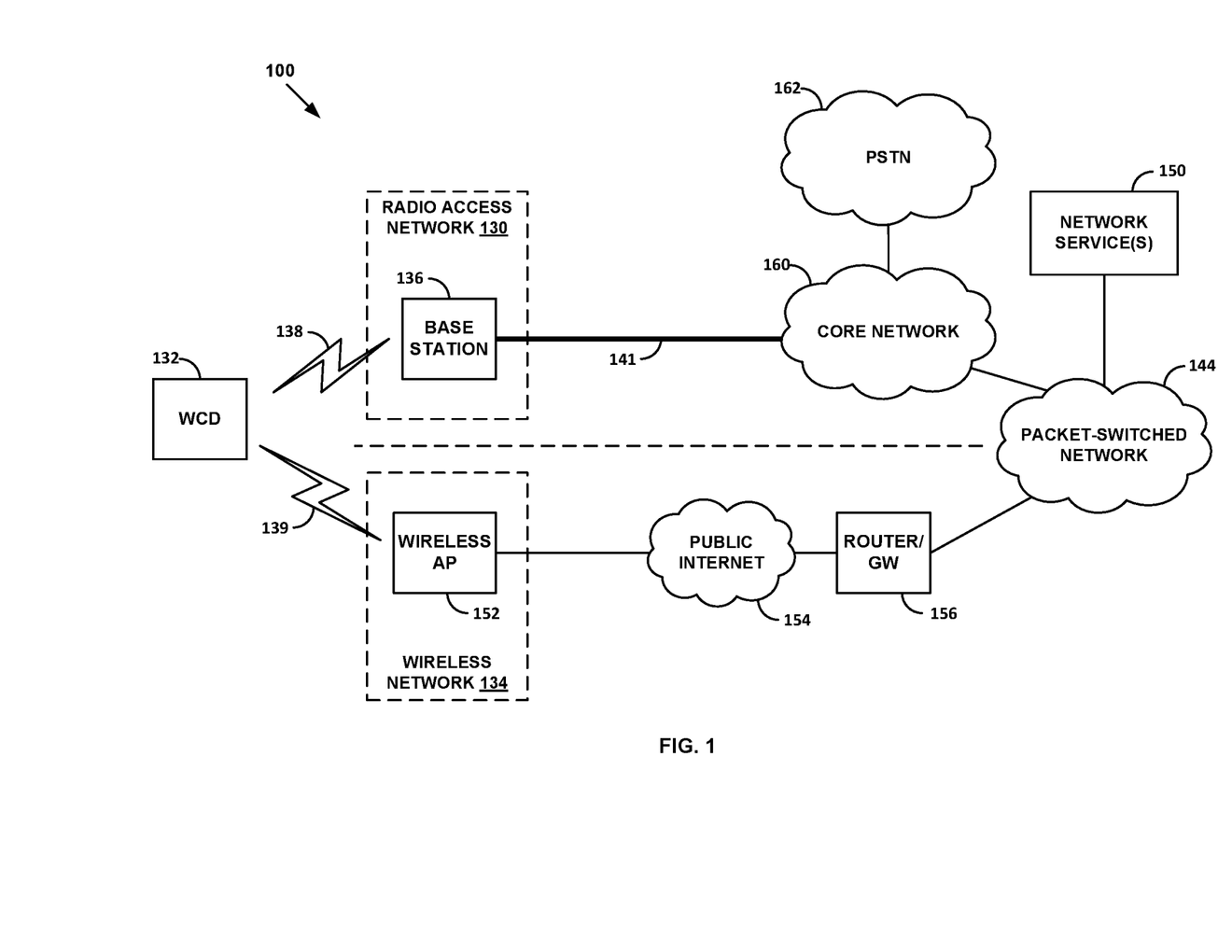
FIG. 1 is a simplified block diagram of a wireless communication system in which the present method and system can be implemented.

FIG. 1 is a simplified block diagram of a network arrangement 100 in which an embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes, by way of example, two representative access networks, a radio access network (RAN) 130 and a wireless network 134, each of which may function to provide client devices with access to one or more transport networks. The RAN 130 includes a base station 136 with a direct backhaul connection 141 to a core network 160, which in turn is communicatively connected with a PSTN 162 and a packet-switched network 144. The base station 136 provides access for a WCD 132 via an air interface 138. The packet-switched network 144 is depicted as including a representative server 150 that may host one or more network services. The RAN 130, core network 160, backhaul 141, packet network 144 and server 150, among possibly other elements shown or not shown, may be considered components of a wireless service provider's (e.g., wireless carrier's) wireless communication system.

The RAN 130 and base station 136 may be configured to support cellular wireless services that serve client devices such as WCD 132 in accordance with an air interface protocol such as Orthogonal Frequency Division Multiple Access (OFDMA (e.g., Long Term Evolution (LTE) or Wireless Interoperability for Microwave Access (WiMAX)), Code Division Multiple Access (CDMA), Global System for Mobile Communications (GSM), or the like, and a switch or gateway that connects with a transport network such as the PSTN or the Internet. The representative WCD 132 may then be a wireless communication device such as a cell phone, wirelessly-equipped computer, embedded wireless module, or the like, configured to be served wirelessly by such a base station and to engage in voice and/or data communication via the base station and the switch or gateway with entities on the PSTN or Internet. Other examples are possible as well.

With this example arrangement, the WCD 132 may be served by the RAN 130 and may be in communication via the RAN 130 with the server 150, for example. As described above, the WCD 132 may be registered with the RAN 130, which may have assigned air interface traffic resources on which the communication device can transmit and receive packet data. The RAN 130, or other network element, may have assigned an IP address for use by the communication device to communicate on the packet-switched network 144. The WCD 132 may therefore engage in packet-data communication with the server 150 through a path that includes the air interface 138 and the backhaul 141 to the core network 160 and beyond.

The WCD 132 may also acquire wireless access via the wireless network 134. As shown, the wireless network 134 includes a wireless access point (WAP) 152 that provides a wireless access link 139. By way of example, the WAP 152 has a communicative connection with a public internet 154, which in turn is connected to the packet-switched network of the wireless carrier by way of a router/gateway 156. The WCD 132 may be assigned another IP address for communication via the wireless network 134.

FIG. 2A is again a simplified block diagram of a network arrangement 200 in which an embodiment of the present method and system can be implemented, but including some additional detail. The arrangement of FIG. 2A includes a RAN 230 and a WiFi network 234, each of which may function to provide client devices with access to one or more transport networks. By way of example, the RAN 230 includes a BTS 212 under the control of an RNC 236 with one backhaul connection 241 to a switch 244 (e.g., an MSC) and another backhaul 237 to a gateway 240. The switch 244 provides connectivity to a PSTN 245, and is also connected to an authorization server 246. The gateway 240 is connected to a packet-switched network 242. The BTS 212 provides access for a WCD 232 via an air interface 238. The packet-switched network 242 is depicted as including the authorization server 246, as well as a representative server 250 that may host one or more network services. Each of these servers may comprise one or more computers or computerized systems having one or more processors and associated components arranged to carry out various functions as described. The RAN 230, switch 244, gateway 240, packet-switched network 242, server 250 and authorization server 246, among possibly other elements shown or not shown, may be considered components of a wireless service provider's (e.g., wireless carrier's) wireless communication system.

Figure 2A:
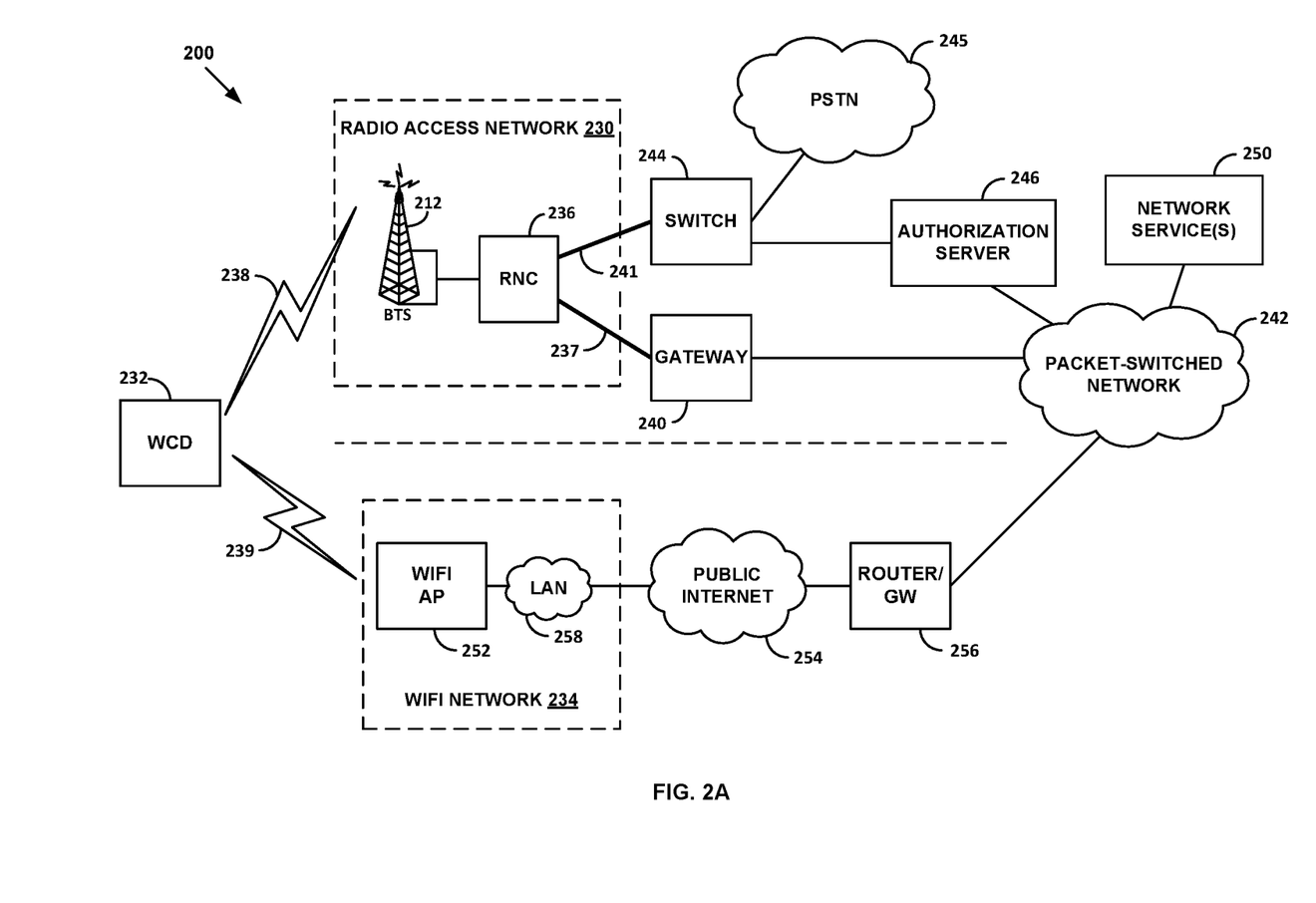
FIG. 2A is a further detailed block diagram of example network arrangement in which the present method and system can be implemented.

The RNC 236 functions to control various aspects of BTS operation and various aspects of air interface operation, such as handoffs of WCDs between BTSs and the like. The gateway 240, such as a packet data serving node (PDSN), provides connectivity with the packet-switched network 242.

The WiFi network 234 includes, by way of example, a WiFi AP 252 that provides the WCD 232 a wireless access link 239. Also by way of example, the WiFi AP 252 is connected with a LAN 258 having a communicative connection with a public internet 254, which in turn is connected to the packet-switched network of the wireless carrier by way of a router/gateway 256. The WiFi network 234 could be a home wireless network or a WiFi hotspot, for example. While the WiFi network 234 can provide the WCD 232 with access to services in the wireless carrier's network, communications between the WCD 232 and those services are typically routed via one or more intermediate networks. In the illustration of FIG. 2A, for example, the communication path includes a public internet 254, and the WiFi network 234 itself includes a LAN 258.

Wireless access via the WiFi network 234 may or may not require specific authorization or credentials, and any such authorization or credentials need not necessarily be the same or even related to those required for RAN access. For example, the WiFi network could provide completely open access, such as might be found in a café or other public space. Alternatively, it could require a password or encryption key, as might be the case for a secure home network or business place WiFi network. On the other hand, access via the RAN 230 and/or access to services provided to by the wireless carrier to its subscribers do require specific authorization, which as noted may be handled by the authorization server 246.

Generally, the authorization server 246 functions to maintain or manage records of WCDs that are authorized to be served with wireless communication service by the wireless carrier. This includes WCDs that are associated with active service accounts of users who subscribe to service with the wireless carrier (i.e., WCDs that subscribe to service with the wireless carrier). The records may be stored in a subscriber database or an authorization database (not shown in FIG. 2A), for example, which can be consulted by the authorization server 246 in response authorization requests, and updated as necessary or appropriate as the status of WCDs' authorizations change.

In practice, when any such WCD gets authorized to be served by the wireless carrier (e.g., at the time of purchase by a subscribing user), the authorization server 246 may be directed to establish or update a record for the WCD to indicate that the WCD is authorized and should be allowed to access the network, possibly with certain limitations. For example, when a WCD is first commissioned or activated for service in a wireless carrier's network, a unique hardware identifier, such as an electronic serial number (ESN), may be provided to the authorization server 246. The WCD may then be furnished with a mobile identification number (MIN). Once authorization is established and service becomes active, the WCD may include the MIN/ESN combination in future registration and/or access requests.

Further, when a WCD that is currently authorized to be served by the wireless carrier becomes de-authorized (e.g., its associated subscriber account with the wireless carrier gets terminated), the authorization server 246 may be directed to update the record for the WCD to indicate that the WCD is no longer authorized and therefore should not be allowed to access the network, or authorization server 246 may simply delete the record for the WCD. De-authorization from previously authorized service can occur when a WCD is decommissioned or deactivated from service. For example, when a user buys a new WCD to replace a currently commissioned WCD, the commissioned WCD may be decommissioned as part of a process the commissions the new (replacement) WCD.

In general practice, after a WCD subscribes to be served by the wireless carrier, the WCD may register with the wireless carrier whenever the WCD enters into coverage of the wireless carrier's RAN, or when the WCD moves from one coverage area to another. For instance, in the arrangement of FIG. 2A, when WCD 232 enters into a coverage area of the BTS 212, the WCD may detect a pilot signal being broadcast by the BTS on a downlink pilot channel of the coverage area. In response, the WCD may then read a system parameter message, such as a sync channel message for instance, to learn operational parameters of the detected coverage area, such as any special procedures to use when seeking access. And the WCD may then transmit a registration request in an access request, referred to as an "access probe," to the BTS on an uplink access channel. Further, if the access probe transmission is not successful, the WCD may retransmit the access probe, and the WCD may repeat the retransmission up to a threshold number of times until the transmission either succeeds, or the WCD determines that access in unavailable, at least temporarily, and ceases trying to gain access.

Upon successful receipt of the access probe, BTS 212 may forward the registration request to RNC 236, which may in turn forward the request to the switch 244. The switch 244 may then communicate with authorization server 246 (e.g., the switch may communicate with a home location register (HLR) that in turn communicates with the authorization server) to determine whether the WCD seeking registration is authorized to be served with wireless communication service. If so, the switch may send a registration success message in response to the WCD, and the RAN may update its records to indicate that the WCD is currently operating in the coverage area of the BTS 212 or generally in coverage of the switch 244, to facilitate later communications to the WCD.

Further, once a WCD is registered with the wireless carrier, the WCD may acquire wireless packet data connectivity if the WCD is so equipped. To do so, for instance, the WCD may transmit a packet-data origination request or connection request in an access probe to the serving BTS, again on an uplink access channel. Assuming the WCD is authorized to engage in such communication, the RAN may then assign air interface resources (e.g., an air interface traffic channel or address) for use by the WCD. The WCD may then also acquire an Internet Protocol (IP) address for use to engage in communication on the packet-switched network and may proceed to engage in packet-data communication with other entities on the network.

When a WCD, such as WCD 232, requests registration or air interface access from a RAN, such as RAN 230, it can take multiple attempts, each in the form of an access request or access probe from the WCD to the RAN before a request is granted. This can occur, for example, due to high load in the coverage area that the WCD is operating in when it makes its request. In practice, a WCD may have to "contend" for access with other WCDs similarly, and randomly, requesting access. As a result, the WCD may need to repeat its access attempts a number of times unsuccessfully (e.g., unanswered by the RAN) before the RAN successfully receives the WCD's request and/or has air interface resources available to honor the request. In typical operation, after making a threshold number of unsuccessful attempts—e.g., a threshold number of answered access probes—the WCD will cease sending access probes and "give up" until some later triggering event causes it to try again. For instance, the WCD may move to new coverage area, or its power may be cycled. By way of example, the threshold number of attempts could be 15, possibly in three consecutive groups of five consecutive probes each, where the WCD increases the transmission power of each successive probe in a group. Other threshold numbers and/or groupings could be used as well.

In addition to general communication functions, such as voice calls, texting, email, and web browsing, a WCD may host (e.g., execute via one or more processors) one or more apps that, from time to time, initiate communications with one or another service or server in or via the wireless carrier's network. As mentioned above, some such services might be ones offered by the wireless carrier to its subscribers, and may further require the WCD to be registered or otherwise authorized. Non-limiting examples can include uploading of backup data (e.g., "cloud" storage), synchronization of data, and requesting software and/or firmware updates. While some similar services could possibly be offered by third parties, other than the wireless carrier, when offered by the wireless carrier, these services could require authorization of some or all related service requests from the WCD to ensure the WCD and/or the associated subscriber/user is entitled to the service(s).

When an app on a WCD seeks to initiate communication with a service or server in the wireless carrier's network, it may invoke an action that causes the WCD request air interface access from the RAN. For example, an app may "wake up" once per day (e.g., every evening) and invoke an operation that causes the WCD to transmit one or more access probes. If the WCD is unsuccessful in its attempts to acquire air interface access from the RAN—for example, after the threshold number of failed attempts—the app may the cause the WCD to attempt to communicate with a service or server via a wireless network, such as a WiFi network, if one is available. In this way, the app may then obtain the desired service even though RAN access failed or was unavailable.

Figure 2B:
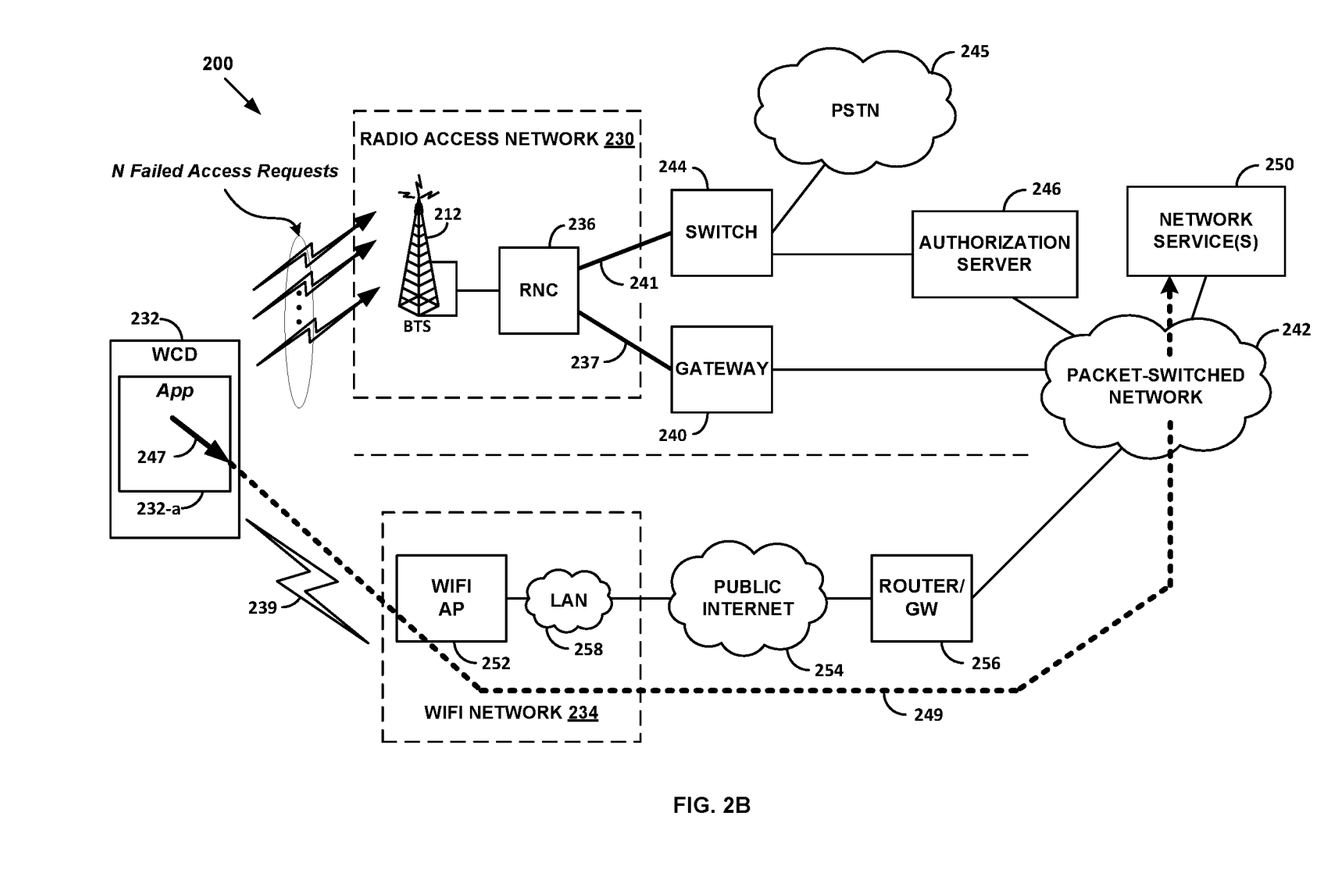
FIG. 2B is a further detailed block diagram of example network arrangement illustrating an aspect of conventional operation.

An example of such operation is illustrated in FIG. 2B, which largely duplicates FIG. 2A, but also depicts some operational aspects. In FIG. 2B, the WCD 232 is shown to include an "App" 232-a, which evidently and by way of example seeks to communicate with the network services 250 in the wireless carrier's packet-switched network 242. Also by way of example, the WCD 232 makes a threshold number of failed access attempts to acquire air interface access from the RAN 230, as indicated, where the threshold number is designated as "N" in the figure. In response to the failure of the WCD to acquire air interface access from the RAN, the App 232-a invokes an action 247 (represented simply as an arrow in the figure) that causes the WCD to transmit a request for service via the WCD's wireless access link 239 with the WiFi AP 252 in the WiFi network 234. Communication between the App 232-a and the network service 250 can then be carried out across a communication path 249 that includes the LAN 258 and the public internet 254 accessible via the wireless access link 239.

As described above, a WCD can be de-authorized from services in a wireless carrier's network when the WCD is decommissioned or possibly for other reasons. A decommissioned WCD may still attempt RAN access from time to time, transmitting up to the threshold number of access request (probes) before ceasing its current round of attempts. In typical operation, the RAN will ignore each access request, having failed each time to obtain authorization from the authorization server. If a decommissioned WCD (or otherwise de-authorized WCD) attempts to acquire RAN access in response to actions of an app, the app may cause the WCD to seek wireless access (e.g., via a WiFi network), as in the example illustrated in FIG. 2B. However, if the service(s) the App 232-a seeks to communicate with is (are) ones that require authorization, the App 232-a will likely be denied one or more (or all) requests for such service.

More particularly, a service request from a decommissioned WCD received in a wireless carrier's network by way of a WiFi or other wireless access network make result in an authorization query to an authorization server or the like. Since the request will have been received from a decommissioned WCD, the authorization request will be denied. But the request will nevertheless consume some amount of network resources and/or incur some operational overhead in the wireless carrier's network. For example, considering again FIG. 2B, a request received on the communication path 249 will contribute network traffic on the wireless carrier's packet-switched network 242. The request may also consume processing cycles on the server 250, possibly contribute further to network traffic on the wireless carrier's packet-switched network 242 associated with an authorization request to the authorization server 246, consume processing cycles on the authorization server 246 for processing and responding to the authorization request, possibly contribute further to network traffic on the wireless carrier's packet-switched network 242 associated with a denial response from the authorization server 246, and possibly contribute more network traffic if a service denial response is transmitted to the WCD 232 via the communication path 249.

While the resource/overhead scenario described above for one app on one WCD is not necessarily a precise description of what may occur on any given request from the WCD 232, it serves to illustrate that service requests from decommissioned WCDs received via one or more wireless access networks are not necessarily without impact or consequence to network operations and/or performance. In particular, the number of WCDs decommissioned from service in wireless carrier's network can become quite large, especially as new generations of WCDs are purchased or obtained by subscribers to replace their existing WCDs. The aggregate impact on network operations and performance can correspondingly become non-negligible or even substantial. It would therefore be desirable mitigate this source of degradation of network operations and performance.

In accordance with example embodiments, a WCD that fails to acquire RAN access after a threshold number of consecutive attempts will in response cause one or more computer applications—e.g. apps—to refrain from attempting to initiate communications with one or more servers and/or servers in the wireless carrier's network. More specifically, in response to detecting that each of the threshold number of consecutive access requests (or probes) to the RAN have failed to result in air interface access, the WCD will take action that effectively disables one or more apps from initiating communications with one or more services or servers of the wireless carrier. In doing so, the WCD can thereby reduce or eliminate communications between the one or more apps and the one or more services or servers that might otherwise impact network operations and/or performance.

Figure 2C:
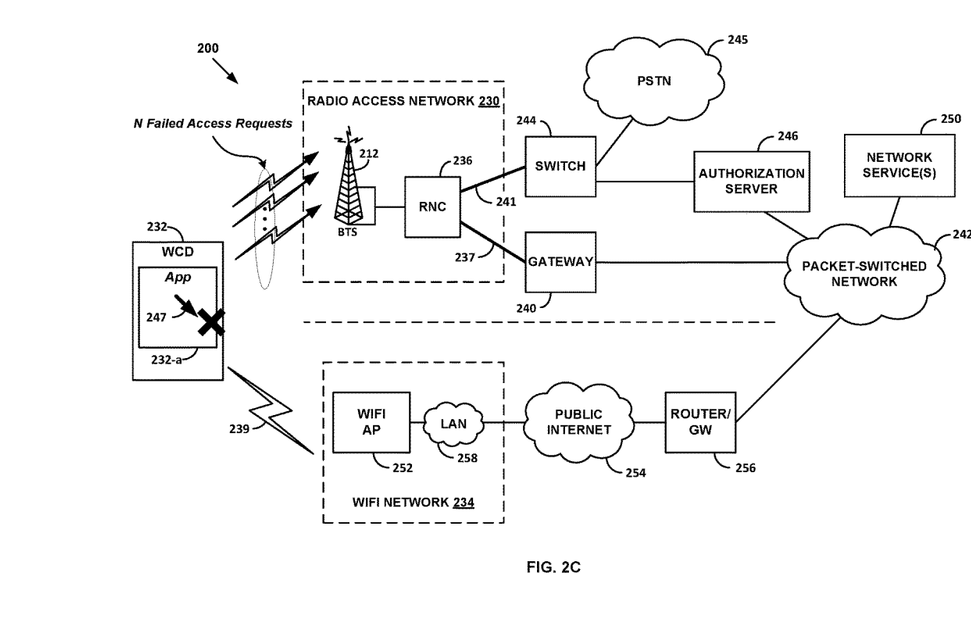
FIG. 2C is a further detailed block diagram of example network arrangement illustrating example operation in accordance with example embodiment.

FIG. 2C illustrates an operational example, in accordance with example embodiments. By way of example, the App 232-a running of the WCD 232 seeks to communicate with the network services 250 in the wireless carrier's packet-switched network 242. Also by way of example, the WCD 232 makes a threshold number, N, of failed access attempts to acquire air interface access from the RAN 230, as indicated. In response to the failure of the WCD to acquire air interface access from the RAN, the WCD 232 disables the App 232-a from attempting to initiate communications with network services 250 via the WiFi network 234, even though the WCD 232 may still have the wireless access link 239 available for other communications via the WiFi network. As a visual cue, the disabling operation is represented symbolically by an "X" suppressing the invoked an action 247 that would otherwise cause the WCD to transmit a request for service via the WCD's wireless access link 239 with the WiFi AP 252 in the WiFi network 234. As a result, no request is transmitted via the WiFi network 234 to the network services 250 in the wireless carrier's packet-switched network 242. The representation in FIG. 2C does not necessarily signify an interrupted or aborted attempt at communication by the App 232-a, but rather that the App 232-a refrains from an attempt to begin with.

In further accordance with example embodiments, the App 232-a could be configured with a settable flag or other controlling parameter that it consults when determining if it should attempt to initiate communication with the network services 250 upon failure to achieve such communication via the RAN. Then, upon detecting that each of the threshold number of consecutive access requests (or probes) to the RAN have failed to result in air interface access, the WCD can set the flag (or parameter) to indicate to the App 232-*a* not attempt to initiate the communications. In this way, the App's behavior regarding initiating communications via the WiFi network 234 can be controlled or modified based on the WCD's failure to acquire air interface access via the RAN.

The example operation described above for the App 232-*a* could be applied to multiple application programs running or executable on a WCD. For example, a software environment of a WCD could include an application manager program or the like that provides, among other possible functions, a manager interface for adjusting various settable parameters of the managed applications. Some or all of those applications configured for communicating with services and/or servers in the wireless carrier's network could each include a flag that can be set via the manager interface. In this way, the WCD could effectively disable these applications from attempting to communicate with one or more services and/or servers in the wireless carrier's network in response to detection the threshold number of consecutive failed attempts at acquiring RAN access.

In addition or as an alternative to using settable flags or parameters to disable apps from initiating communications with services and/or servers in the wireless carrier's network, disabling such communications can also be achieved by tagging or marking specific services and/or servers for omission from outgoing communications. For example, network addresses and/or other network-routing identifiers for the specific services and/or servers could be placed in a "do not contact" list or the like. All or particular portions of a such list could be supplied to specific, particular apps, so as to cause the specific apps to refrain from initiating communications to the addresses (or other routing identifiers) in their respective (possibly partial) list. Additionally or alternatively, a global "do not contact" list or the like could be used by the WCD to prevent initiating WiFi (or other wireless access) communications to some or all addresses (or other routing identifiers) in the global list. In this case, an app might still attempt to initiate WiFi communication with a particular service or server, but the WCD would decline to actually make a corresponding transmission. From the point of view of such an app, it might then appear as if the service or server did not respond. Other possible techniques for disable apps from initiating communications with services and/or servers in the wireless carrier's network could be implemented as well.

By disabling apps from initiating communications with the wireless carrier's network or otherwise causing them to refrain from doing in response to determining that air interface access from a RAN cannot be acquired after the threshold number of consecutive failed attempts, a decommissioned (or otherwise de-authorized) WCD can be prevented from consuming a wireless carrier's network resources or incurring operational overhead by way of non-RAN wireless access to the carrier's wireless communication system. The aggregate or multiplicative effect of doing so for a large number of decommissioned WCDs that may still be powered on and capable of attempting communications can be to spare a wireless carrier's network from a potentially large operation burden, and thereby avoid unnecessary service degradation.

In the event that an activated and authorized WCD experiences a similar failure to acquire RAN access, its apps may also be subject to being disabled from initiating such communications. In practice, the failure of an activated and authorized WCD to gain RAN access is usually related to a temporary condition, and the WCD may subsequently successfully gain RAN when the condition abates or operational circumstances change. For example, a WCD could move to a different coverage area, causing it to retry acquiring RAN access, this time with success. The failure of a decommissioned (or de-authorized) WCD to acquire RAN access, on the other hand, will generally correspond to a permanent or semi-permanent state. Further aspects of example embodiments can be used to either (i) distinguish between RAN-access failure due to lack of authorization versus a temporary condition, or (ii) re-enable apps to initiate communications when a hosting WCD's RAN-access failure is determined to be a temporary condition.

In accordance with example embodiments, when a WCD having failed to acquire RAN access due to a temporary condition later acquires RAN access, it can reset the flags or parameters of one or more apps that were previously set to disable their attempts at initiating communications with services or servers in the wireless carrier's network. Or it can revise or modify a "do not contact" list appropriately. In this way the apps may again attempt to communicate with these services and servers via a WiFi or other wireless access network.

In further accordance with example embodiments, a WCD can distinguish between its failure to acquire RAN due to a lack of authorization (its being decommissioned) versus a temporary condition by tracking the number of consecutive threshold-request attempts to gain RAN access that result in failure. More particularly, the WCD can keep track of each instance of a threshold number of consecutive failed access requests to a RAN. While any one such instance of a threshold-number of failures could correspond to a temporary condition, as described above, if the WCD has two or more consecutive instances of a threshold-number of failures, the likelihood increases that condition is permanent (or semi-permanent), and therefore that the WCD has been decommissioned, or otherwise de-authorized. Thus, the operation of disabling one or more apps from initiating communication with the wireless carrier's wireless communication system described above could be modified to cause the disabling operation after two or more consecutive instances of a threshold-number of failures. For example, three consecutive such instances could trigger the disabling operation.

While disabling decommissioned WCDs from attempting to initiate communications with the wireless carrier's network can mitigate the burden of servicing such communications, decommissioned WCDs can also represent a continued source of revenue for a wireless carrier if network services can be offered outside of the context of authorization and/or subscription. For example, a decommissioned WCD can still be a computing platform for apps that use a la carte and/or pay-as-you-go services. Accordingly, when a WCD is decommissioned, the wireless carrier may nevertheless preserve identifying and/or other information associated with the WCD that allows the wireless carrier to initiate communications with the WCD, even if the WCD has been disabled from doing so with the wireless carrier's network. One way this could be achieved is to modify the disabling operation to allow one or more otherwise disabled apps on a decommissioned WCD to continue to initiate communications, but on a reduced-frequency basis compared to how often the app would do so if the WCD were still authorized. This would still reduce the burden of such communications on the wireless carrier, while enabling the wireless carrier to discover a network address for contacting the WCD without going through the RAN. The contact address could in turn then be used by the wireless carrier to initiate communications with the WCD and possibly offer one or more services to the decommissioned device.

Figure 3:
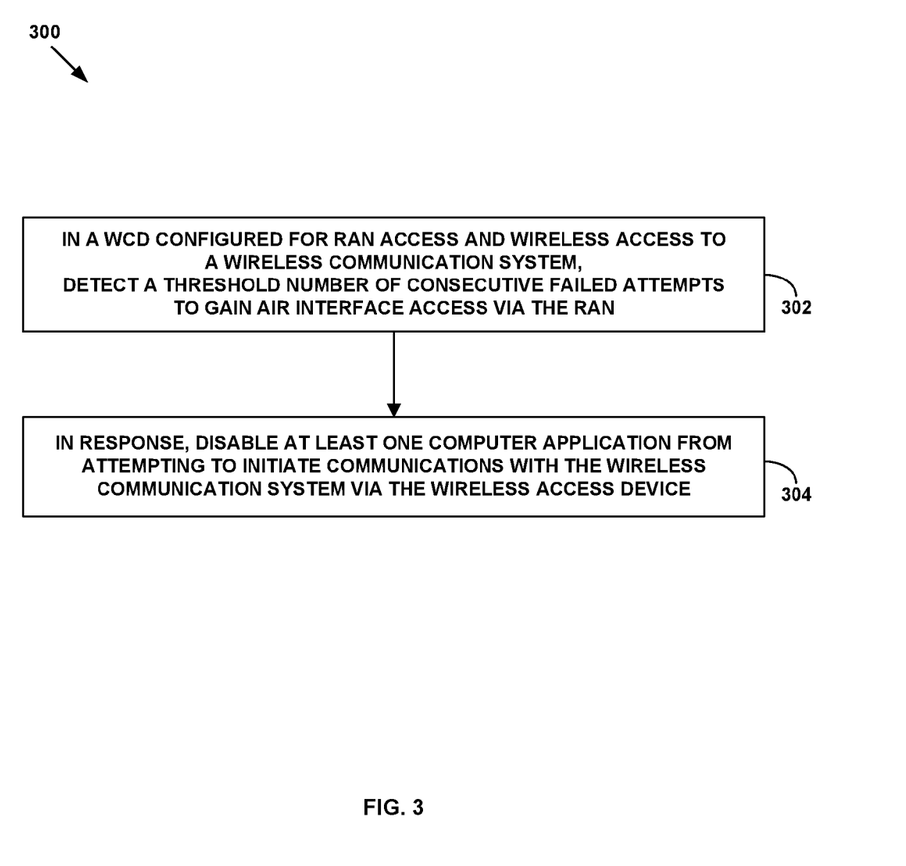
FIG. 3 is a flow chart depicting example method, in accordance with example embodiments.

FIG. 3 is a flowchart illustrating a method 300, according to an example embodiment. Illustrative methods, such as method 300, may be carried out in whole or in part by a WCD, such as by the WCD 232 shown in FIG. 2C. By way of example, the method 300 can be implemented as machine language instructions that can be stored on non-transitory machine-readable media (e.g. solid state memory, magnetic disk, etc.), and that when executed by one or more processors of a WCD to cause the WCD to carry out operations, steps, and/or functions of the method. In particular, the method 300 involves a method carried out by a WCD configured for communicating with a wireless communication system via (i) air interface access with a RAN having a dedicated backhaul connection to the wireless communication system, and (ii) a wireless access device providing a communication link to at least one intermediate network in a communication path to the wireless communication system.

As shown by block 302 in FIG. 3, the method 300 entails the WCD detecting a threshold number of consecutive failed attempts to gain air interface access via the RAN.

As shown by block 304 in FIG. 3, method 300 next entails, the WCD, in response to the detecting step of block 302, disabling at least one computer application from attempting to initiate communications with the wireless communication system via the wireless access device.

In accordance with example embodiments, the failure of the WCD to acquire RAN access can be used as an indicator that the WCD has been de-authorized from previous authorization to receive services from the wireless communication system. For example, the WCD may be a decommissioned device.

In accordance with example embodiments, detecting the threshold number of consecutive failed attempts to gain air interface access via the RAN can entail the WCD transmitting an access request to the RAN at each of the threshold number of consecutive times, where the WCD fails to acquire access from the RAN in response to any one of the transmitted access requests.

In accordance with example embodiments, disabling the at least one computer application from attempting to initiate communications with the wireless communication system via the wireless access device can entail disabling the at least one computer application from sending a service request message to at least one of a server in the wireless communication system or a service provided by the wireless communication system. Further, disabling the at least one computer application from attempting to initiate communications with the wireless communication system via the wireless access device can entail setting a flag that causes the at least one computer application to refrain from sending a service request message to at least one network address in the wireless communication system.

In accordance with example embodiments, the at least one computer application can be configured for initiating periodic communications with a service provided by the wireless communication system. In this case, disabling the at least one computer application from attempting to initiate communications with the wireless communication system via the wireless access device can entail reconfiguring the at least one computer application to cause it to refrain from initiating the periodic communications with the service provided by the wireless communication system. Still further, disabling the at least one computer application from attempting to initiate communications with the wireless communication system via the wireless access device can entail causing the WCD to refrain from attempting to initiate any communications with the wireless communication system via the wireless access device.

In an example embodiment, the RAN can operate according to CDMA protocols, LTE protocols, or both. Similarly, the WCD can be configured for accessing the RAN according to one or another or both of CDMA protocols or LIE protocols. Further, the wireless access device can be a wireless access point that operates according to WiFi protocols, and the WCD can similarly be configured for accessing the wireless access device according the WiFi protocols.

In further accordance with example embodiments, the method 300 could also include the WCD receiving a message from the wireless communication system via the wireless access device, where the message indicates a service of the wireless communication system available to the WCD. Then, in response to receiving the message, the WCD could engage in communications with the service via the wireless access device. For example, in addition to possibly removing and/or invalidating the WCD's credentials when the WCD is decommissioned or otherwise de-authorized, the wireless communication system could target the WCD for one or more special service offers or solicitations available to non-subscribing users and/or to decommissioned WCDs of subscribing users. For instance, the wireless communication system could enter one or another identifier of the decommissioned WCD in a list of similarly targeted WCDs, and one or more of the wireless carrier's services or servers can attempt to contact one or more WCDs (or selected apps on the WCDs) in the list from time to time via one or another wireless access network. This could provide the wireless carrier with a potential source of revenue from services used by otherwise decommissioned WCDs.

It will be appreciated that the example method and 400 could include alternate and/or additional steps, while still remaining within the scope and spirit of example embodiments herein.

Figure 4:
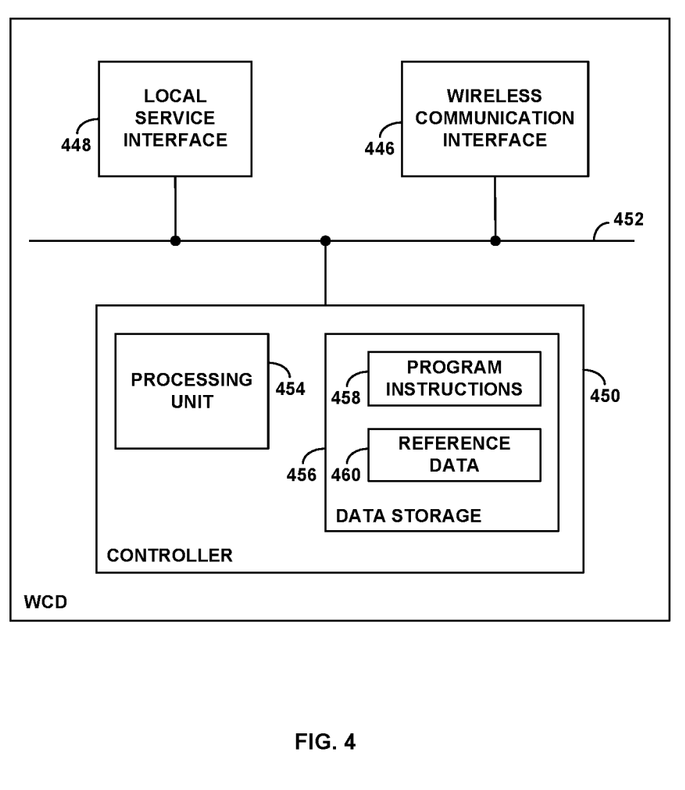
FIG. 4 is simplified block diagram of an example WCD operable in accordance with the disclosure.

FIG. 4 is next a simplified block diagram of a WCD, showing some of the components that such a device could include in accordance with an example implementation. In particular, the example WCD is configured to communicate with devices and/or services in or via a wireless communication system via (i) air interface access with a RAN having a dedicated backhaul connection to the wireless communication system, and (ii) a wireless access device providing a communication link to at least one intermediate network in a communication path to the wireless communication system.

As shown in FIG. 4, the example WCD includes a wireless communication interface 446, local service interface 448, and a controller 450, all of which could be coupled together or otherwise interconnected by a system bus, network, or other connection mechanism 452. Further, these or other components of the WCD could be integrated together in various ways. For instance, the controller could be provided as logic on a chipset that also serves as at least part of the wireless communication interface or local service interface. And the wireless communication interface and local service interface could be combined together. Further, the WCD could include other components and take other forms. For instance, if the WCD is user operated, the WCD could include a user interface. Other examples are possible as well.

In the example WCD, the wireless communication interface 446 could be configured to engage in wireless communications with both a base station that serves the WCD and a wireless access device (e.g., a WiFi AP). As such, the wireless communication interface could include a radio compliant with the protocols that the WCD will use for communication with the base station, such as LTE for instance, and could further include an antenna structure for transmitting and receiving via the wireless channel. The wireless communication interface could also include a radio compliant with the protocols that the WCD will use for communication with the WAP, such as WiFi for instance.

The local service interface 448 could then be configured to engage in communication directly or indirectly with one or more other devices. For example, the local service interface could provide for wired and/or wireless communication with the one or more other devices. For instance, the local service interface could include a wireless communication interface that operates to communicate with one or more other entities over the same air interface protocol used by wireless communication interface 446 or over a different air interface protocol. (By way of example, the wireless communication interface 446 could communicate with the serving base station according to LTE, and the local service interface 448 could communicate with other devices using LTE or using WiFi.) Alternatively, the local service interface could be configured for connection with a wired link such as an Ethernet connection or other cable connection with one or more other entities.

The controller 450 could be configured to control operation of the WCD including implementing various WCD operations described herein.

As shown by way of example, the controller could include a processing unit 454 and data storage 456. Processing unit 554 could comprise one or more general purpose processors (e.g., microprocessors) and/or one or more special-purpose processors (e.g., application specific integrated circuits or digital signal processors). And data storage 456 could comprise one or more non-transitory volatile and/or non-volatile storage components, such as magnetic, optical, or flash memory, and could hold or be encoded with program instructions 458 and reference data 460. Program instructions 458 could be executable by processing unit 454 to carry out various WCD operations described herein. For example, program instructions 458 could implement one or more apps, such as App 232-*a*. And reference data 460 could include various data to facilitate carrying out the operations, such as maintaining one or more flags or settable parameters, as describe above.

Exemplary embodiments have been described above. Those skilled in the art will appreciate, however, that many variations from the embodiments are possible while remaining within the spirit and scope of the claims.

We claim:

1. In a wireless communication device (WCD) configured for communicating with a wireless communication system via (i) air interface access with a radio access network (RAN) providing cellular wireless access to and having a dedicated backhaul connection to the wireless communication system, and (ii) a wireless access device of a wireless local area network, the wireless access device providing a communication link to at least one intermediate network in a communication path to the wireless communication system, a method comprising:

detecting, by the WCD, a threshold number of consecutive failed attempts to gain air interface access via the RAN; and responsive to the detecting, the WCD disabling at least one computer application from attempting to initiate further communications with a server in the wireless communication system or service of the wireless communication system via the wireless access device and the at least one intermediate network in the communication path to the wireless communication system.

2. The method of claim 1, wherein the WCD has been de-authorized from previous authorization to receive services from the wireless communication system.

3. The method of claim 1, wherein detecting by the WCD the threshold number of consecutive failed attempts to gain air interface access via the RAN comprises:

the WCD transmitting an access request to the RAN at each of the threshold number of consecutive times; and the WCD failing to acquire access from the RAN in response to any one of the transmitted access requests.

4. The method of claim 1, wherein disabling the at least one computer application from attempting to initiate further communications with a server in the wireless communication system or service of the wireless communication system via the wireless access device comprises:

disabling the at least one computer application from sending a service request message to at least one of a server in the wireless communication system or a service provided by the wireless communication system.

5. The method of claim 1, wherein disabling the at least one computer application from attempting to initiate further communications with a server in the wireless communication system or service of the wireless communication system via the wireless access device comprises:

setting a flag that causes the at least one computer application to refrain from sending a service request message to at least one network address in the wireless communication system.

6. The method of claim 1, wherein the at least one computer application is configured for initiating periodic communications with a service provided by the wireless communication system, and wherein disabling the at least one computer application from attempting to initiate further communications with a server in the wireless communication system or service of the wireless communication system via the wireless access device comprises reconfiguring the at least one computer application to cause it to refrain from initiating the periodic communications with the service provided by the wireless communication system.

7. The method of claim 1, disabling the at least one computer application from attempting to initiate further communications with a server in the wireless communication system or service of the wireless communication system via the wireless access device comprises causing the WCD to refrain from attempting to initiate any communications with the wireless communication system via the wireless access device.

8. The method of claim 1, wherein the RAN operates according to at least one of CDMA protocols or LTE protocols, and the WCD is configured for accessing the RAN according to the at least one of CDMA protocols or LTE protocols, and wherein the wireless access device is a wireless access point that operates according to WiFi protocols, and the WCD is configured for accessing the wireless access device according the WiFi protocols.

9. The method of claim 1, further comprising:
the WCD receiving a message from the wireless communication system via the wireless access device, the message indicating a service of the wireless communication system available to the WCD; and
in response to receiving the message, the WCD engaging in communications with the service via the wireless access device.

10. A wireless communication device (WCD) configured for communicating with a wireless communication system via (i) air interface access with a radio access network (RAN) providing cellular wireless access to and having a dedicated backhaul connection to the wireless communication system, and (ii) a wireless access device of a wireless local area network, the wireless access device providing a communication link to at least one intermediate network in a communication path to the wireless communication system, the WCD comprising:
a transceiver for communicating on at least each of the air interface access with the RAN and a wireless interface with the wireless access device;
one or more processors; and
memory accessible to the one or more processors, and storing machine language instructions that, upon execution by the one or more processors, cause the WCD to carry out operations including:
detecting a threshold number of consecutive failed attempts to gain air interface access via the RAN, and
responsive to the detecting, disabling at least one computer application from attempting to initiate further communications with a server in the wireless communication system or service of the wireless communication system via the wireless access device and the at least one intermediate network in the communication path to the wireless communication system.

11. The WCD of claim 10, wherein the WCD has been de-authorized from previous authorization to receive services from the wireless communication system,
and wherein detecting by the WCD the threshold number of consecutive failed attempts to gain air interface access via the RAN comprises:
transmitting an access request to the RAN at each of the threshold number of consecutive times; and
failing to acquire access from the RAN in response to any one of the transmitted access requests.

12. The WCD of claim 10, wherein the at least one computer application is configured for initiating periodic communications with a service provided by the wireless communication system,
and wherein disabling the at least one computer application from attempting to initiate further communications with a server in the wireless communication system or service of the wireless communication system via the wireless access device comprises:
setting a flag that causes the at least one computer application to refrain from sending periodic service request messages to a server hosting the service provided by the wireless communication system.

13. The WCD of claim 10, wherein disabling the at least one computer application from attempting to initiate further communications with a server in the wireless communication system or service of the wireless communication system via the wireless access device comprises causing the WCD to refrain from attempting to initiate any communications with the wireless communication system via the wireless access device.

14. The WCD of claim 10, wherein the RAN operates according to at least one of CDMA protocols or LTE protocols, and the WCD is configured for accessing the RAN according to the at least one of CDMA protocols or LTE protocols,
and wherein the wireless access device is a wireless access point that operates according to WiFi protocols, and the WCD is configured for accessing the wireless access device according the WiFi protocols.

15. The WCD of claim 10, wherein the operations further include:
receiving a message from the wireless communication system via the wireless access device, the message indicating a service of the wireless communication system available to the WCD; and
in response to receiving the message, engaging in communications with the service via the wireless access device.

16. A non-transitory computer readable medium having stored thereon instructions that, upon execution by one or more processors of a wireless communication device (WCD), cause the WCD to carry out operations, wherein the WCD is configured for communicating with a wireless communication system via (i) air interface access with a radio access network (RAN) providing cellular wireless access to and having a dedicated backhaul connection to the wireless communication system, and (ii) a wireless access device of a wireless local area network, the wireless access device providing a communication link to at least one intermediate network in a communication path to the wireless communication system, and wherein the operations include:
detecting a threshold number of consecutive failed attempts to gain air interface access via the RAN; and
responsive to the detecting, disabling at least one computer application from attempting to initiate further communications with a server in the wireless communication system or service of the wireless communication system via the wireless access device and the at least one intermediate network in the communication path to the wireless communication system.

17. The non-transitory computer readable medium of claim 16, wherein the at least one computer application is configured for initiating periodic communications with a service provided by the wireless communication system,
and wherein disabling the at least one computer application from attempting to initiate further communications with a server in the wireless communication system or service of the wireless communication system via the wireless access device comprises:
setting a flag that causes the at least one computer application to refrain from sending periodic service request messages to a server hosting the service provided by the wireless communication system.

18. The non-transitory computer readable medium of claim 16, wherein disabling the at least one computer application from attempting to initiate further communications with a server in the wireless communication system or service of the wireless communication system via the wireless access device comprises causing the WCD to refrain from attempting to initiate any communications with the wireless communication system via the wireless access device.

19. The non-transitory computer readable medium of claim 16, wherein the RAN operates according to at least one of CDMA protocols or LTE protocols, and the WCD is configured for accessing the RAN according to the at least one of CDMA protocols or LTE protocols, and wherein the wireless access device is a wireless access point that operates according to WiFi protocols, and the WCD is configured for accessing the wireless access device according the WiFi protocols.

20. The non-transitory computer readable medium of claim 16, wherein the operations further include:

receiving a message from the wireless communication system via the wireless access device, the message indicating a service of the wireless communication system available to the WCD; and in response to receiving the message, engaging in communications with the service via the wireless access device.

\* \* \* \* \*